Dec. 24, 1935. J. HORA 2,025,453
SLIDING CLASP FASTENER WITH FASTENER ELEMENTS OF NONMETALLIC MATERIALS
Filed March 20, 1935
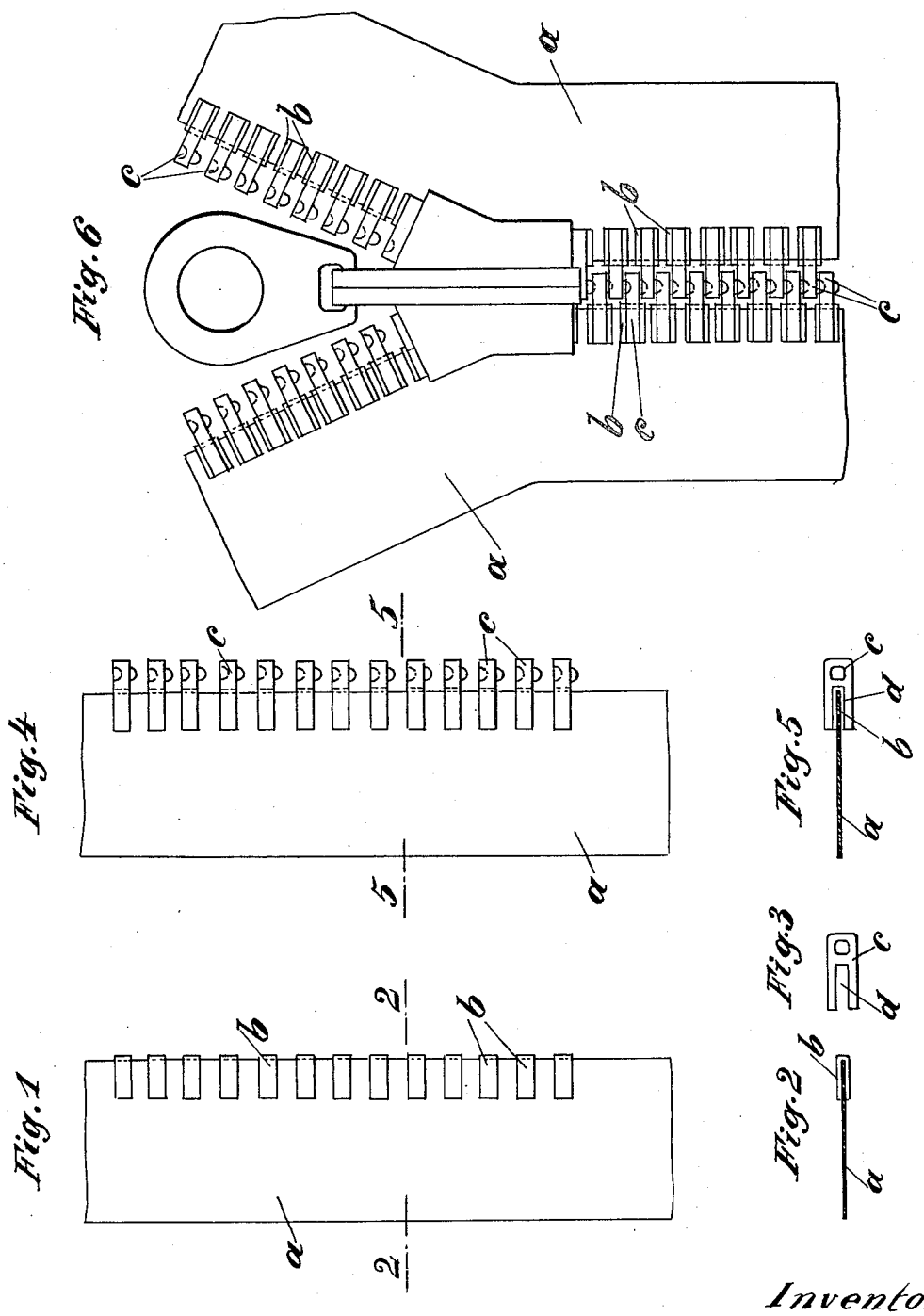
Inventor;

Patented Dec. 24, 1935

2,025,453

UNITED STATES PATENT OFFICE 2,025,453

SLIDING CLASP FASTENER WITH FASTENER ELEMENTS OF NONMETALLIC MATERIALS

Josef Hora, Wuppertal-Oberbarmen, Germany

Application March 20, 1935, Serial No. 12,019
In Germany March 6, 1934

2 Claims. (Cl. 24—205)

This invention relates to an interlocking sliding clasp fastener, the fastener elements of which are made of non-metallic substances, such as artificial resin, celluloid, cellulose acetate, known as "Cellon", or "Trolit" and the like, that is of materials which can be stuck by heat or the employment of liquids.

In the known sliding clasp fasteners of this kind these non-metallic fastener elements are either produced securely fixed on the fabric or are fixed on the stringers with the aid of chemical solvents, adhesives or glues.

All these known sliding clasp fasteners are open to great objections because the fixing of such fastener elements on the stringer is much more difficult than the fixing of metal elements which can be tightly clinched in a simple manner and moreover the stringer becomes soiled, destroyed or damaged. The adhesion of the elements on the stringer is often very unsatisfactory so that the fastener cannot be opened any more if even one fastener element has loosened.

If fastener elements made of artificial resin or of similar non-metallic substances are produced tightly fixed on the fabric, the choice of the element shapes is very restricted as not all kinds of fastener elements, especially those which have proved particularly practical, can be well shaped in this manner. Moreover, the stringer is detrimentally affected by the spreading of the material at the portions situated between the individual elements. This applies particularly in the case of sliding clasp fasteners the non-metallic elements of which are, according to other suggestions secured on the fabric by gluing or sticking with the aid of a chemical solvent. In order in these fasteners to tightly connect the individual elements with the stringer, the stringer must be saturated with the solution. This stringer is thereby not only stiffened and soiled by the running of the color of colored elements, but an absolutely secure fixing of all the elements is not ensured because solvents are very greatly influenced by the temperature in the factory and evaporate more or less quickly according to the temperature of the workroom. Furthermore, the elements cannot be reliably fixed on the stringer if they are applied by the use of heat. Moreover, in all these known sliding clasp fasteners the application of the fastener elements, when they must be applied singly, is extremely difficult because the band has the tendency of rolling and a time-wasting skill is required for pushing over on to the edge of the stringer the narrow slot of each individual element only corresponding to the thickness of the thin stringer. In order to give these fastener elements a sufficiently large bearing surface, they must be made correspondingly wide, as narrow stamped elements cannot be employed. Consequently, it has been necessary in such fasteners to press the elements with the result that the manufacturing process which is in any case costly is made still more expensive.

All these objections inherent to the known sliding clasp fasteners are overcome by the invention.

The novelty of the invention consists chiefly in that the interlocking fastener elements and their bearing elements on the stringers are made of similar material, ensuring a homogenous union of the elements slipped on to the stringer, so that, as compared with the known fasteners, a particularly good adhesion of the elements is attained. Moreover, the points at which the elements bear on the stringers are additionally thickened. This presents the advantage that the fastener elements are particularly easy to apply as the slot in each element, by means of which it is slipped on to the thickening or bearing element of the stringer made of the same material, is much wider than in the known elements. The wide bearing is attained by the additionally applied thickenings which, being smooth, can be pressed on to the stringer without spreading and may be wider than the fastener elements. The fastener elements themselves, whilst adhering more securely, can thus be made narrower and stamped in a simpler manner, whereas in the known fasteners the fastener elements must be pressed.

An embodiment of the invention is illustrated by way of example in the accompanying drawing in which:—

Fig. 1 shows a stringer with bearing elements for the interlocking fastener elements made for example by separately applied thickenings.

Fig. 2 is a section on line 2—2 of Fig. 1.

Fig. 3 shows a single fastener element in top plan view.

Fig. 4 shows in elevation a finished stringer with the fastener elements.

Fig. 5 is a section on line 5—5 of Fig. 4.

Fig. 6 shows a portion of the finished sliding clasp fastener.

$a$ is a stringer with fastener bearing elements $b$ stuck thereon and interlocking fastener elements $c$ stuck on the bearing elements and which are made of the same material as the bearing elements ensuring a homogenous connection of the elements. In the example illustrated the bearing elements on the stringers are made of separately applied thickenings. They may, however, be made of any suitable material similar to that of the fastener elements, for example artificial resin, "Trolit", celluloid, "Cellon" or the like, which is capable of homogeneously uniting with the material of the elements. These separately applied bearing elements for the fastener elements may for example be rolled on, pressed, stuck, cemented or fixed in some other suitable manner on the stringer a, preferably under heat and pressure, so that the material of the bearing elements or supports b can penetrate into the fabric. The fixation may likewise be effected with the aid of a chemical solvent, such as acetone or the like. For increasing the strength the material may consist of a mixture of artificial resin and celluloid.

In the form of construction illustrated in Figs. 1 and 4 the additional thickenings b or bearing elements are each formed of a narrow strip corresponding to the thickness of the fastener elements. This strip is bent over in U-shape at the front and made of suitable material. It is fixed by one of the aforementioned methods. Moreover, two strips situated opposite one another on the band a and forming the bearing elements for the interlocking fastener elements may be applied for each fastener element. The thickening b may also be wider than the fastener element, as shown in Fig. 6 and is preferably made of colorless material. These colorless supports or bearing elements for the fastener elements present the advantage that, when employing chemical solvents, the colored fastener elements do not stain the stringer. The colored fastener elements c are made of the same material as the separately applied thickenings b serving as bearing elements for the fastener elements, that is are of a material which has the same properties as that of the thickenings and homogeneously unites therewith. Owing to the thickenings b the slot d of the element c, by means of which the element is slipped on to the thickening, is considerably wider than that in the known non-metallic elements so that the fitting of the elements is greatly facilitated and simplified. The fixation of the fastener elements on the bearing elements or supports b is effected in the same manner as the application of the bearing elements themselves, that is by rolling, pressing or sticking, in the last instance under pressure and heat and by using a suitable binding substance or chemical solvent, such as acetone or the like, the bearing elements or supports b homogeneously uniting with the material of the applied fastener elements owing to the similarity of the material or because both materials have the same effect. In view of the character of the material, this is particularly the case when the fastener elements are applied with the aid of a chemical solvent, such as acetone or the like and with simultaneous application of heat and pressure.

As the bearing elements b constructed as separately applied thickenings are or may be wider than the fastener elements, the latter may be made narrow and can thus be produced in a simple manner by stamping the wide slot being formed in the stamping operation.

I claim:—

1. A sliding clasp fastener, comprising in combination, a pair of stringers, bearing elements adhesively secured to said stringers at spaced intervals thereon, and interlocking fastener elements, one on each of said bearing elements, said bearing elements and said interlocking elements being made of the same non-metallic material and homogeneously united.

2. A sliding clasp fastener as specified in claim 1, in which the bearing elements on the stringers are wider than the interlocking fastener elements.

JOSEF HORA.